United States Patent
Walker

(10) Patent No.: US 10,960,390 B2
(45) Date of Patent: Mar. 30, 2021

(54) PARTIAL BURN COMBUSTOR REGENERATOR

(71) Applicant: UOP LLC, Des Plaines, IL (US)

(72) Inventor: Patrick D. Walker, Park Ridge, IL (US)

(73) Assignee: UOP LLC, Des Plaines, IL (US)

( * ) Notice: Subject to any disclaimer, the term of this patent is extended or adjusted under 35 U.S.C. 154(b) by 311 days.

(21) Appl. No.: 16/052,311

(22) Filed: Aug. 1, 2018

(65) Prior Publication Data

US 2018/0339290 A1 Nov. 29, 2018

Related U.S. Application Data

(63) Continuation of application No. PCT/US2017/029265, filed on Apr. 25, 2017.

(60) Provisional application No. 62/335,421, filed on May 12, 2016.

(51) Int. Cl.
| | | |
|---|---|---|
| *B01J 38/32* | (2006.01) | |
| *B01J 8/26* | (2006.01) | |
| *C10G 11/18* | (2006.01) | |
| *B01J 38/12* | (2006.01) | |
| *B01D 53/50* | (2006.01) | |
| *B01D 53/86* | (2006.01) | |

(52) U.S. Cl.
CPC .............. *B01J 38/32* (2013.01); *B01D 53/50* (2013.01); *B01D 53/865* (2013.01); *B01J 8/26* (2013.01); *B01J 38/12* (2013.01); *C10G 11/182* (2013.01); *B01D 2257/302* (2013.01); *B01D 2257/502* (2013.01); *B01D 2259/40081* (2013.01); *C10G 2300/708* (2013.01)

(58) Field of Classification Search
CPC ... B01J 38/32; B01J 8/26; B01J 38/12; B01D 53/50; B01D 53/865; B01D 2257/302; B01D 2257/502; B01D 2259/40081; C10G 11/182; C10G 2300/708
USPC .......................................................... 502/34
See application file for complete search history.

(56) References Cited

U.S. PATENT DOCUMENTS

| 4,959,334 A | 9/1990 | Mauleon et al. |
| 8,753,502 B1 | 6/2014 | Sexton et al. |

FOREIGN PATENT DOCUMENTS

| GB | 1495843 A | 12/1977 |
| WO | 2009155138 A1 | 12/2009 |

OTHER PUBLICATIONS

Indian First Examination Report dated Aug. 14, 2019 for corresponding in Application No. 201817022920.
Extended European Search Report dated Nov. 18, 2019 for corresponding EP Application No. 17796554.8.

*Primary Examiner* — Edward M Johnson
(74) *Attorney, Agent, or Firm* — Paschall & Associates, LLC; James C. Paschall

(57) ABSTRACT

A process for combusting coke from catalyst in partial burn mode is disclosed. The regenerator comprises two chambers. The bulk of the combustion is performed in a first chamber. Disengagement of the catalyst from gas is conducted in the second chamber. Heated gas with a low fraction of oxygen fluidizes catalyst in the second chamber.

15 Claims, 1 Drawing Sheet

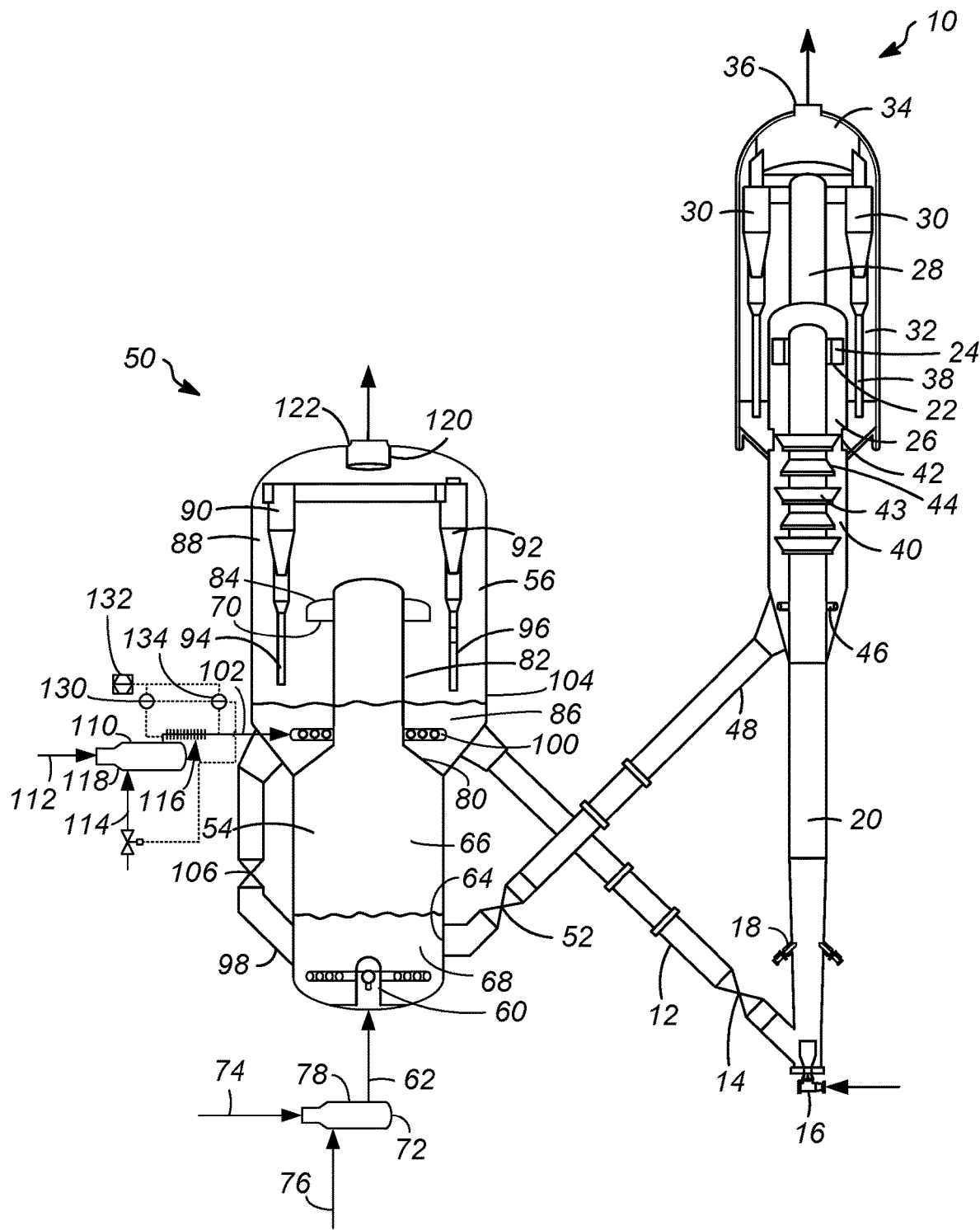

PARTIAL BURN COMBUSTOR REGENERATOR

CROSS-REFERENCE TO RELATED APPLICATIONS

This application is a Continuation of copending International Application No. PCT/US2017/029265 filed Apr. 25, 2017, which application claims priority from U.S. Provisional Application No. 62/335,421 filed May 12, 2016, the contents of which cited applications are hereby incorporated by reference in their entirety.

FIELD

The field of the subject matter relates to catalyst regeneration in fluidized catalytic cracking units, and more particularly relates to a partial burn combustor.

BACKGROUND

Fluid catalytic cracking (FCC) is a hydrocarbon conversion process accomplished by contacting hydrocarbons in a fluidized reaction zone with a catalyst composed of finely divided particulate material. The reaction in catalytic cracking, as opposed to hydrocracking, is carried out in the absence of substantial added hydrogen or the consumption of hydrogen. As the cracking reaction proceeds highly carbonaceous material referred to as coke is deposited on the catalyst. A high temperature regeneration operation within a regeneration zone combusts coke from the catalyst. Coke-containing catalyst, referred to herein as coked catalyst, is continually removed from the reaction zone and replaced by essentially coke-free catalyst from the regeneration zone. During the regeneration process water is produced by the combustion of coke.

Fluidization of the catalyst particles by various gaseous streams allows the transport of catalyst between the reaction zone and regeneration zone. Hot air is typically heated, at least at start up, by firing the air in a direct fired air heater with hydrocarbon fuel before it is blown into the regenerator.

Highest feedstock conversion may require essentially complete removal of coke from the catalyst often referred to as complete regeneration. In order to obtain complete regeneration, the catalyst has to be in contact with oxygen for sufficient residence time to permit thorough combustion of coke. Partial regeneration occurs when complete regeneration does not occur. Partial regeneration occurs when regeneration produces a catalyst having at least 0.1 and preferably at least 0.05 and typically at least 0.03 wt % coke. Insufficient oxygen concentration or catalyst residence time can result in partial regeneration. Partial regeneration can also result in a lower ratio of carbon dioxide to carbon monoxide in the flue gas. Partial regeneration can be advantageous to reserve recovery of the heat of combustion of carbon monoxide to carbon dioxide in a downstream CO boiler. Conventionally, in a partial combustion operation, it is difficult to burn all of the carbon off the catalyst. The residual carbon can have a negative effect on catalyst activity. Partial burn in the regenerator occurs when the oxygen content is present in the flue gas with a concentration of less than 0.1% at the outlet of the regenerator vessel.

A high efficiency, combustor-style regenerator has a lower chamber that burns nearly all the coke to carbon dioxide with low excess oxygen, typically, as the catalyst is transported upwardly. As the catalyst and flue gas mixture enters an upper, narrower section of the lower chamber, the upward velocity is further increased and the two-phase mixture exits through a primary disengager into the second chamber. The disengager and cyclones in the second chamber separates the catalyst from the flue gas and returns the catalyst to a dense catalyst bed which supplies hot regenerated catalyst to both the riser reactor to contact fresh feed and the lower combustor chamber to heat the incoming spent catalyst.

Fluffing air is injected into the dense catalyst bed in the second chamber and may account for as much as 2 wt % of the total air requirement for catalyst combustion. Oxygen in the fluffing air can lead to after burn in the regenerator if sufficient carbon monoxide is present. After burn is a phenomenon that occurs when hot flue gas that has been separated from regenerated catalyst contains carbon monoxide that combusts to carbon dioxide in a dilute phase of catalyst. Insufficient catalyst is present in the dilute phase to serve as a heat sink to absorb the heat thus subjecting surrounding equipment to temperatures that can exceed metallurgical limits. Due to the concern of after burn in the dilute phase of the second chamber, combustor regenerators have not been operated in partial burn mode in the lower chamber.

Therefore, there is a need to equip a combustor regenerator to operate in partial burn mode without risking after burn.

SUMMARY

An embodiment is a process and apparatus for combusting coke from catalyst in a first chamber. The catalyst and flue gas are is passed to a second chamber in which catalyst and gas are separated. A heater combusts hydrocarbon fuel with air to heat a gas stream and deplete oxygen from the air. The heated gas stream is fed to the second chamber of a combustor regenerator to fluidize catalyst in the second chamber. The coked catalyst may be regenerated in a partial burn mode in the first chamber because little oxygen will be present in the second chamber preventing the risk of after burn. The heated gas stream will also prevent condensation of sulfuric acid and water that can lead to corrosion.

BRIEF DESCRIPTION OF THE DRAWING

The FIGURE is a schematic, elevational view of an FCC unit incorporating the present subject matter.

DETAILED DESCRIPTION

Combustor regenerator shells are susceptible to corrosion particularly in the lower section of the second chamber. Sulfur trioxide and water in the flue gas can combine to form sulfuric acid. When the shell temperature is sufficiently low, the sulfuric acid will condense to cause corrosion. Insufficient fluidization can allow portions of the shell temperature to fall below the dew point of sulfuric acid.

Combustor regenerators have not been conventionally operated in partial burn mode. The principal obstacle has been the concern for after burn which would be induced by the excess oxygen from fluidization air in the second chamber. The need for sufficient fluidization in the second chamber has militated against partial burn operation in the lower chamber.

A solution proposed for both problems features an auxiliary heater which heats a gas stream for fluidization of catalyst in the second chamber of a combustor regenerator. The auxiliary heater may combust oxygen in air with a hydrocarbon fuel to reduce the oxygen concentration. The resulting heated gas stream may be fed to the second chamber to fluidize catalyst in the second chamber. Combustion in the heater will consume oxygen, so the heated gas stream can be reduced to a sufficiently low oxygen concentration to prevent after burn in the second chamber. The heated gas stream will maintain the shell of the second chamber at sufficiently high temperature to prevent condensation of sulfuric acid to prevent corrosion.

Although other uses are contemplated, the process and apparatus of the present subject matter may be embodied in an FCC unit. FIG. 1 shows an FCC unit that includes a reactor section 10 and a regenerator vessel 50. A regenerated catalyst conduit 12 transfers regenerated catalyst from the regenerator vessel 50 at a rate regulated by a control valve 14 to a riser 20 of the reactor section 10. A fluidization medium such as steam from a nozzle 16 transports regenerated catalyst upwardly through the riser 20 at a relatively high density until a plurality of feed distributor nozzles 18 inject hydrocarbon feed across the flowing stream of catalyst particles. The catalyst contacts the hydrocarbon feed cracking it to produce smaller, cracked hydrocarbon products while depositing coke on the catalyst to produce coked catalyst.

A conventional FCC hydrocarbon feedstock and higher boiling hydrocarbon feedstock are suitable fresh hydrocarbon feed streams. The most common of such conventional fresh hydrocarbon feed stocks is a "vacuum gas oil" (VGO), which is typically a hydrocarbon material having a boiling range with an IBP of no more than about 340° C. (644° F.), a T5 between about 340° C. (644° F.) to about 350° C. (662° F.), a T95 between about 555° C. (1031° F.) and about 570° C. (1058° F.) and an EP of no more than about 640° C. (1184° F.) prepared by vacuum fractionation of atmospheric residue. As used herein, the term "T5" or "T95" means the temperature at which 5 volume percent or 95 volume percent, as the case may be, respectively, of the sample boils using ASTM D-86.

Such a fraction is generally low in coke precursors and heavy metal contamination which can serve to contaminate catalyst. Atmospheric residue is a preferred feedstock boiling with an IBP not more than about 340° C. (644° F.), a T5 between about 340° C. (644° F.) and about 360° C. (680° F.) and a T95 of between about 700° C. (1292° F.) and about 900° C. (1652° F.) obtained from the bottom of an atmospheric crude distillation column. Atmospheric residue is generally high in coke precursors and metal contamination. Other heavy hydrocarbon feed stocks which may serve as fresh hydrocarbon feed include heavy bottoms from crude oil, heavy bitumen crude oil, shale oil, tar sand extract, deasphalted residue, products from coal liquefaction, vacuum reduced crudes. Fresh hydrocarbon feed stocks also include mixtures of the above hydrocarbons and the foregoing list is not comprehensive.

The FCC catalyst may include a large pore zeolite, such as a Y-type zeolite and a matrix material comprising an active alumina material, a binder material, including either silica or alumina, and an inert filler such as kaolin.

The resulting mixture of cracked hydrocarbon products and coked catalyst continues upwardly through the riser 20 to a top at which a plurality of disengaging arms 22 tangentially and horizontally discharge the mixture of gas and catalyst from a top of the riser 20 through ports 24 into a disengaging vessel 26 that effects a rough separation of gases from the catalyst. A transport conduit 28 carries the hydrocarbon vapors, including stripped hydrocarbons, stripping media and entrained catalyst to one or more cyclones 30 in a reactor vessel 32 which separates coked catalyst from the hydrocarbon vapor stream. The reactor vessel 32 may at least partially contain the disengaging vessel 26, and the disengaging vessel 26 is considered part of the reactor vessel 32. A collection chamber 34 in the reactor vessel 32 gathers the separated hydrocarbon vapor streams from the cyclones 30 for passage to an outlet nozzle 36 and eventually into a fractionation recovery zone (not shown). Dip legs 38 discharge catalyst from the cyclones 30 into a lower portion of the reactor vessel 32, and the catalyst and adsorbed or entrained hydrocarbons pass into a stripping section 40 of the reactor vessel 32 across ports 42 defined in a wall of the disengaging vessel 26. Catalyst separated in the disengaging vessel 26 passes directly into the stripping section 40. The stripping section 40 contains baffles 43, 44 or other equipment to promote mixing between a stripping gas and the catalyst. The stripping gas enters a lower portion of the stripping section 40 through a conduit to one or more distributors 46. The stripped, coked catalyst leaves the stripping section 40 of the reactor vessel 32 through a reactor catalyst conduit 48 and passes to the regenerator vessel 50 at a rate regulated by a control valve 52. The coked catalyst from the reactor vessel 32 usually contains carbon in an amount of from 0.02 to 1.50 wt %, which is present in the form of coke. Although coke is primarily composed of carbon, it may contain from 3 to 12 wt % hydrogen as well as sulfur and other materials.

The regenerator may be a regenerator vessel 50 for combusting coke from catalyst comprising a first chamber 54 and a second chamber 56. The regenerator may be a combustor-style regenerator vessel 50 in which the first chamber 54 is a lower chamber and the second chamber 56 is an upper chamber that may be above the first chamber. The first chamber has a catalyst inlet 64 for feeding coked catalyst to the first chamber 54 and a gas distributor 60. The gas distributor 60 distributes combustion gas comprising oxygen from a combustion gas line 62 to the first chamber 54.

The catalyst inlet 64 delivers coked catalyst to the first chamber 54 of the regenerator vessel 50. Oxygen-containing combustion gas, typically air, from combustion gas line 62 is distributed by the gas distributor 60 to the first chamber 54 of the regenerator vessel 50. The combustion gas contacts coked catalyst in the first chamber 54 and lifts the catalyst under fast fluidized flow conditions which form in a dilute phase 66 above a dense phase catalyst bed 68. In an embodiment, flow conditions in the first chamber 54 will include a superficial gas velocity of 0.8 to 2.2 m/s (2.8 to 7 ft/s) and a catalyst density of from about 16 kg/m$^3$ (1 lb/ft$^3$) to about 80 kg/m$^3$ (5 lb/ft$^3$) in the dilute phase 66 and from about 320 kg/m3 (20 lb/ft3) to about 560 kg/m3 (35 lb/ft3) in the dense phase catalyst bed 68. The oxygen in the combustion gas contacts the coked catalyst and combusts carbonaceous deposits or coke from the catalyst. Combustion gas comprising air may be added in proportions to combust coke from the coked catalyst in a partial burn mode to generate a flue gas stream and regenerated catalyst. The first chamber 54 may be operated with insufficient oxygen to promote partial burn conditions. Accordingly, the regenerated catalyst may be partially regenerated catalyst.

To maintain partial burn conditions in the first chamber 54, the oxygen concentration in the flue gas stream at an inlet 70 to the second chamber 56 may be less than 0.1 mole % and preferably no greater than 200 ppm. The carbon monoxide concentration in the flue gas stream from the first chamber 54 may be maintained at about 200 ppm or greater and preferably at about 3 mole % or greater. The mole ratio of carbon dioxide to carbon monoxide in the flue gas may be no more than about 10 and preferably no more than about 4 and at least about 0.5 and preferably at least about 1.0 at the inlet 70 into the second chamber 56 from the first chamber 54 of the regenerator vessel 50.

The regenerator vessel 50 may receive a combustion gas stream from a main heater 72. Typically, the main heater 72 is a direct fired air heater 72. The main heater 72 comprises a vessel 78 in communication with a fuel source comprising a fuel line 76 and an air source comprising an air line 74 for combusting fuel and air in the vessel 78. The hydrocarbon fuel stream can comprise dry gas, fuel gas, torch oil, etc. During use, the air stream in the air line 74 and a hydrocarbon fuel stream in the fuel line 76 may be fed to the heater, contacted with each other in the heater to combust to generate heat while providing a heated combustion gas stream comprising oxygen. The heated combustion gas stream is taken in the combustion gas conduit 62 and distributed by the combustion gas distributor 60 to the first chamber 54 in the regenerator vessel 50. The combustion gas conduit 62 connects the main heater 72 with the first chamber 54. Generally, the direct fired air heater 72 is used during the start-up of the fluid catalytic cracking unit 10. Afterwards, often the direct fired air heater 72 is shut down during steady-state operations such that only the air stream is fed therethrough to the combustion gas distributor conduit 62 but the fuel stream may be stopped.

The mixture of regenerated catalyst and the flue gas stream flow through a frustoconical transition section 80 to the transport, passage 82 of the first chamber 54. The passage 82 may comprise a tubular riser that extends upwardly from the first chamber 54. The passage 82 provides communication between the first chamber 54 and the second chamber 56. A catalyst disengager 84 may be on the inlet 70 of the passage 82 in the second chamber 56. The regenerated catalyst and flue gas stream accelerates to a higher superficial gas velocity due to the reduced cross-sectional area of the passage 82 relative to the cross-sectional area of the first chamber 54 below the transition section 80.

The regenerated catalyst and flue gas from the first chamber 54 are passed through the passage 82 to the catalyst disengager 84 into the second chamber 56 of the regeneration vessel 50. The catalyst disengager 84 roughly separates regenerated catalyst from the flue gas stream such as by directing the catalyst and flue gas stream downwardly, so that the catalyst will disengage while fall downwardly into a dense catalyst bed 86 and the flue gas stream will disengage while ascending upwardly into a dilute phase of catalyst 88.

The regenerated catalyst and the flue gas entering the second chamber 56 from the first chamber may have a relatively large concentration of carbon monoxide due to the partial burn conditions in the first chamber 54. To avoid the after burn phenomenon in the second chamber 56, the second chamber must be starved of oxygen to avoid combusting the carbon monoxide in the flue gas to carbon dioxide. Fluidizing gas is distributed to the second chamber 56 by a fluffing distributor 100 to fluidize catalyst in the dense catalyst bed 86. Air is typically used as a fluidizing gas. Because the air contains oxygen, partial combustion has not been practiced in the first chamber 54 because the air can oxidize the carbon monoxide to carbon dioxide which can precipitate after burn in the second chamber 56, particularly in the dilute phase 88.

It is proposed to provide a heated gas stream in a heated gas conduit 102 to the second chamber 56. The heated gas stream can serve to heat a wall 104 or shell of the second chamber 56 to prevent condensation of sulfuric acid produced by sulfur trioxide combined with water in the flue gas, to corrode regenerator equipment. The heated gas stream may be at least 38° C. (100° F.), suitably at least 93° C. (200° F.), preferably at least 204° C. (400° F.) and most preferably at least 427° C. (800° F.).

The heated gas stream in the heated gas conduit 102 may be provided by an auxiliary gas heater 110. The heated gas conduit 102 connects the auxiliary heater 110 with the second chamber 56. The regenerator vessel 50 may receive combustion gas from the auxiliary gas heater 110. The auxiliary gas heater 110 may comprise a vessel 118 in communication with a fuel source and an air source for combusting fuel and air in the vessel. The air source may be an air stream in air line 112 and the hydrocarbon fuel source may be a hydrocarbon fuel stream in fuel line 114. The hydrocarbon fuel stream may comprise dry gas, fuel gas, torch oil, etc. The auxiliary gas heater 110 may be a direct fired air heater 110. The air stream in air line 112 and the hydrocarbon fuel stream in fuel line 114 may be fed to the auxiliary gas heater 110 and are contacted with each other in the heater to combust and generate heat. Flow rates of the hydrocarbon fuel stream and the air stream are controlled to ensure an oxygen concentration in the heated gas stream of no more than 5 wt %, suitably no more than 2 wt % and preferably no more than 1 wt %. At these oxygen concentrations, after burn is not a threat. Suitably, the heated gas stream contains at least 0.001 wt % oxygen. The heated gas stream will also include water, carbon dioxide, carbon monoxide and nitrogen, but less than 10 wppm sulfur oxides.

The heated gas stream may be taken in the heated gas conduit 102 and distributed by the gas distributor 100 to the second chamber 56 in the regenerator vessel 50 to fluidize the catalyst in the dense catalyst bed 86. The low concentration of oxygen in the heated gas stream will provide insufficient oxygen to enable after burn to occur in the second chamber 56 of the regenerator vessel 50. The heated gas stream in heated gas conduit 102 is distributed to the second chamber 56 in the heated gas distributor 100 separately from the flue gas stream passed from the first chamber 54 through the inlet 70.

To ensure that the heated gas stream in the heated gas conduit 102 is not too hot equipment may be provided to cool the heated gas stream. For example, fins 116 may be provided on the heated gas conduit 102 to conduct heat away from the heated gas stream through the fins from which heat may radiate away from the heated gas conduit 102. Accordingly, the heated gas stream may be cooled before it is distributed to the second chamber 56. Other systems for adjusting the temperature of the heated gas stream are contemplated.

It is important to maintain an oxygen concentration below a set point in the heated gas conduit 102. Accordingly, an oxygen concentration indicator controller 130 is in communication with the heated gas conduit 102 to measure the concentration of oxygen of the heated gas stream in the heated gas conduit 102 to compare it to the oxygen concentration set point. The comparison may be performed by a computer 132 that receives a signal of the measured oxygen concentration from the oxygen concentration indicator controller 130. If the oxygen concentration is greater than the set point, then the control valve on the fuel line 114 is opened relatively more to increase the flow rate of hydrocarbon fuel to the heater 110 to combust more oxygen from the air stream in line 112. If the oxygen concentration is less than the set point, then the control valve on the fuel line 114 is closed relatively more to decrease the flow rate of hydrocarbon fuel to the heater 110 to combust less oxygen from the air stream in line 112. The signal to the control valve on line 114 may be sent from the oxygen concentration indicator controller 130 or from the computer 132.

A temperature indicator controller 134 may also be in communication with line 102 downstream of the cooling fins 116. The temperature indicator controller 134 measures the temperature of the heated gas stream in the heated gas conduit 102 to compare it to the temperature set point. The comparison may be performed by the computer 132 that receives a signal of the measured temperature from the temperature indicator controller 134. If the temperature is greater than the set point, then the control valve on the fuel line 114 is opened relatively more to increase the flow rate of hydrocarbon fuel to the heater 110. If the temperature is less than the set point, then the control valve on the fuel line 114 is closed relatively more to decrease the flow rate of hydrocarbon fuel to the heater 110. The signal to the control valve on line 114 may be sent from the temperature indicator controller 134, the oxygen concentration indicator controller 130 or the computer 132. The signal from the oxygen concentration indicator controller 130 may be set to override the signal from the temperature indicator controller 134.

The regenerated catalyst is transported from the regenerator riser 82 through the disengager 84 into the second chamber 56. Additionally, the catalyst disengager 84 discharges regenerated catalyst through the inlet 70 into a dense catalyst bed 86. The flue gas stream from the regenerator riser 82 exiting from the first chamber 54 will enter the dilute phase 88 of the second chamber 56.

Regenerated catalyst may be entrained with the flue gas stream ascending in the dilute phase 88 in the second chamber 56 of the regenerator vessel 50. The catalyst entrained in the flue gas stream will therefore enter cyclone separators 90, 92 which centripetally separate flue gas from heavier catalyst particles. The cyclone separators 90, 92 directly communicate with the second chamber 56 to separate flue gas from the regenerated catalyst in the second chamber 56. Catalyst particles will fall down dip legs 94, 96 and enter the dense phase catalyst bed 86. The regenerated catalyst in the dense bed 86 will be fluidized by the heated gas stream from the heated gas conduit 102. Regenerated catalyst from the dense catalyst bed 86 is discharged from the second chamber 56 and transferred to the regenerated catalyst conduit 12. Regenerated catalyst regulated by control valve 14 descends the reactor catalyst conduit 12 from the second chamber 56 back to the reactor section 10 and enters the riser 20 where it again contacts feed as the FCC process continues.

In an embodiment, to accelerate combustion of the coke in the first chamber 54, hot fully regenerated catalyst from the dense catalyst bed 86 in the second chamber 56 may be recirculated into the first chamber 54 via an external recycle catalyst conduit 98 regulated by a control valve 106. Hot regenerated catalyst enters an inlet of recycle catalyst conduit 98 which is connected to and in downstream communication with the second chamber 56. Recirculation of regenerated catalyst, by mixing hot catalyst from the dense catalyst bed 86 with relatively cool, coked catalyst from the reactor catalyst conduit 48 entering the first chamber 54, raises the overall temperature of the catalyst and gas mixture in the first chamber 54.

The regenerator vessel 50 is operated under partial burn conditions in the first chamber 54. Approximately no more than 2 wt % of the total oxygen requirements within the process enters the dense catalyst bed 86 in the second chamber 56 with the remainder being added to the first chamber 54. Typically, no more than 1 wt % of the total oxygen requirements enter the dense bed 86 in the second chamber 56. Preferably, no more than 0.5 wt % of the total oxygen requirements enter the dense bed 86 in the second chamber 56. Consequently, very little combustion occurs in the second chamber 56. Typically 10 to 12 kg (lbs) of air are required per kilogram (pound) of coke fed on catalyst to the regenerator vessel for partial burn. The regenerator vessel 50 typically operates at a temperature of about 594° C. (1100° F.) to about 704° C. (1300° F.) in the first chamber 54 and about 649° C. (1200° F.) to about 760° C. (1400° F.) in the second chamber 56. Pressure may be between 173 kPa (gauge) (25 psig) and 414 kPa (gauge) (60 psig) in both chambers.

The superficial velocity of the combustion gas in the second chamber 56 is typically between about 0.8 m/s (2.7 ft/s) and about 1.2 m/s (4.0 ft/s). The density of the dense bed 86 is typically between about 400 kg/m3 (25 lb/ft3) and about 640 kg/m3 (40 lb/ft3), and the density of the dilute phase 88 is typically between about 4.8 kg/m3 (0.3 lb/ft3) and about 32 kg/m3 (2 lb/ft3) depending on the characteristics of the catalyst.

Flue gas with a lighter loading of catalyst will ascend from the cyclone separators 90, 92 through ducts into plenum 120 and discharge from the second chamber 56 through a flue gas outlet 122. The carbon monoxide content in the flue gas is maintained at least about 200 ppm and preferably at least about 3 mole % at the flue gas outlet 122 of the second chamber 56 of the regenerator vessel and the mole ratio of carbon dioxide to carbon monoxide in the flue gas outlet 122 will be at least about 0.5 and preferably at least about 1 and no more than about 5 and preferably no more than about 4 to indicate partial burn combustion of coke in the regenerator vessel 50. The oxygen concentration in the flue gas exiting the outlet 122 of the second chamber 56 is less than 0.1 mole % and preferably no greater than 200 ppm to indicate partial burn conditions in the regenerator vessel 50.

Specific Embodiments

While the following is described in conjunction with specific embodiments, it will be understood that this description is intended to illustrate and not limit the scope of the preceding description and the appended claims.

A first embodiment of the invention is a process for combusting coke from coked catalyst comprising passing a first stream of coked catalyst downwardly through a first permeable barrier into a first stage; propelling a first stream of oxygen-containing gas upwardly through the first stage in counter-current contact with the first stream of coked catalyst to combust coke from the first stream of coked catalyst to provide a second stream of coked catalyst including regenerated catalyst and a stream of flue gas; propelling the stream of flue gas upwardly from the first stage; inhibiting upward movement of the first stream of coked catalyst in the first stage; passing the second stream of coked catalyst downwardly from the first stage to a second stage below the first stage; propelling a second stream of oxygen-containing gas upwardly through the second stage in counter-current contact with the second stream of coked catalyst to combust coke from the second stream of coked catalyst to provide a third stream of coked catalyst including regenerated catalyst and the first stream of oxygen-containing gas including flue gas; propelling the first stream of oxygen-containing gas from the second stage to the first stage; and inhibiting upward movement of the second stream of coked catalyst in the second stage. An embodiment of the invention is one, any or all of prior embodiments in this paragraph up through the first embodiment in this paragraph wherein the first permeable barrier inhibits upward movement of the first stream of coked catalyst in the first stage. An embodiment of the invention is one, any or all of prior embodiments in this paragraph up through the first embodiment in this paragraph wherein a second permeable barrier inhibits upward movement of the second stream of coked catalyst in the second stage. An embodiment of the invention is one, any or all of prior embodiments in this paragraph up through the first embodiment in this paragraph wherein the second permeable barrier is spaced below the first permeable barrier. An embodiment of the invention is one, any or all of prior embodiments in this paragraph up through the first embodiment in this paragraph further comprising delivering the first stream of coked catalyst above the first stage and distributing the second stream of oxygen-containing gas below the second stage. An embodiment of the invention is one, any or all of prior embodiments in this paragraph up through the first embodiment in this paragraph further comprising discharging the stream of flue gas from a flue gas outlet above the first stage and removing a stream of regenerated catalyst from an outlet below the second stage. An embodiment of the invention is one, any or all of prior embodiments in this paragraph up through the first embodiment in this paragraph further comprising passing the third stream of coked catalyst downwardly from the second stage to a third stage below the second stage; propelling a third stream of oxygen-containing gas upwardly through the third stage in counter-current contact with the stream of coked catalyst to combust coke from the coked catalyst to provide a fourth stream of coked catalyst comprising regenerated catalyst and the second stream of oxygen-containing gas including flue gas; and inhibiting upward movement of the third stream of coked catalyst in the third stage. An embodiment of the invention is one, any or all of prior embodiments in this paragraph up through the first embodiment in this paragraph wherein a $CO_2$ to CO ratio is smaller in the first stage than in the second stage. An embodiment of the invention is one, any or all of prior embodiments in this paragraph up through the first embodiment in this paragraph further comprising cooling a stream of coked catalyst and delivering cooled catalyst at or below the first stage. An embodiment of the invention is one, any or all of prior embodiments in this paragraph up through the first embodiment in this paragraph further comprising feeding fresh oxygen-containing gas to the first stage separately from the first stream of oxygen-containing gas from the second stage.

A second embodiment of the invention is a process for combusting coke from coked catalyst comprising passing a first stream of coked catalyst downwardly through a first permeable barrier defining a first stage; propelling a first stream of oxygen-containing gas upwardly through the first stage in counter-current contact with the first stream of coked catalyst to combust coke from the first stream of coked catalyst to provide a second stream of coked catalyst including regenerated catalyst and a stream of flue gas; propelling the stream of flue gas upwardly from the first stage through the first permeable barrier; inhibiting upward movement of the first stream of coked catalyst in the first stage by the first permeable barrier; passing the second stream of coked catalyst downwardly from the first stage through a second permeable barrier to a second stage, the second permeable barrier defining the second stage below the first stage; propelling a second stream of oxygen-containing gas upwardly through the second stage in counter-current contact with the second stream of coked catalyst to combust coke from the second stream of coked catalyst to provide a third stream of coked catalyst including regenerated catalyst and the first stream of oxygen-containing gas including flue gas; propelling the first the stream of oxygen-containing gas through the second permeable barrier from the second stage to the first stage; and inhibiting upward movement of the second stream of coked catalyst in the second stage by the second permeable barrier. An embodiment of the invention is one, any or all of prior embodiments in this paragraph up through the second embodiment in this paragraph wherein the second permeable barrier is spaced below the first permeable barrier. An embodiment of the invention is one, any or all of prior embodiments in this paragraph up through the second embodiment in this paragraph further comprising delivering the first stream of coked catalyst above the first permeable barrier and distributing the second stream of oxygen-containing gas below the second stage. An embodiment of the invention is one, any or all of prior embodiments in this paragraph up through the second embodiment in this paragraph further comprising passing the third stream of coked catalyst downwardly from the second stage through a third permeable barrier to a third stage below the second stage, the third permeable barrier defining the third stage below the second stage; propelling a third stream of oxygen-containing gas upwardly through the third stage in counter-current contact with the third stream of coked catalyst to combust coke from the coked catalyst to provide a fourth stream of coked catalyst comprising regenerated catalyst and the second stream of oxygen-containing gas including flue gas; and inhibiting upward movement of the third stream of coked catalyst in the third stage by the third permeable barrier. An embodiment of the invention is one, any or all of prior embodiments in this paragraph up through the second embodiment in this paragraph wherein the third permeable barrier is spaced below the second permeable barrier.

A third embodiment of the invention is an apparatus for combusting coke from coked catalyst comprising a catalyst inlet to the regenerator vessel above a catalyst outlet from the regenerator vessel; a flue gas outlet from the regenerator vessel above an oxygen-containing gas inlet to the regenerator vessel; a first permeable barrier below the catalyst inlet and the flue gas outlet, the first permeable barrier extending laterally across the regenerator vessel; a second permeable barrier below the first permeable barrier to define a second stage above the catalyst outlet, the second permeable barrier extending laterally across the regenerator vessel; and the catalyst outlet and the oxygen-containing gas inlet below the second permeable barrier. An embodiment of the invention is one, any or all of prior embodiments in this paragraph up through the third embodiment in this paragraph wherein the second permeable barrier is spaced below the first permeable barrier. An embodiment of the invention is one, any or all of prior embodiments in this paragraph up through the third embodiment in this paragraph further comprising a third permeable barrier below the second permeable barrier and above the catalyst outlet and the oxygen-containing gas inlet, the third permeable barrier extending laterally across the regenerator vessel. An embodiment of the invention is one, any or all of prior embodiments in this paragraph up through the third embodiment in this paragraph further comprising a separation device with a flue gas inlet above the first permeable barrier. An embodiment of the invention is one, any or all of prior embodiments in this paragraph up through the third embodiment in this paragraph with an oxygen-containing gas inlet disposed between the first permeable barrier and the second permeable barrier.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process for regenerating coked catalyst comprising:
    contacting coked catalyst with oxygen in a first chamber of a regenerator to combust coke from said coked catalyst to provide regenerated catalyst and a flue gas stream;
    passing said regenerated catalyst and said flue gas stream from said first chamber to a second chamber of said regenerator;
    contacting a hydrocarbon fuel with air to combust the fuel and provide a heated gas stream; and
    distributing said heated gas stream to the second chamber separately from said flue gas stream.

2. The process of claim 1 further comprising operating said first chamber with insufficient oxygen in order to promote partial burn conditions.

3. The process of claim 1 further comprising distributing said heated gas stream to fluidize regenerated catalyst in said second chamber.

4. The process of claim 1 further comprising cooling said heated gas stream before it is distributed to said second chamber.

5. The process of claim 1 wherein said heated gas stream comprises no more than 2 wt % oxygen.

6. The process of claim 1 further comprising contacting a hydrocarbon fuel with air to combust the fuel and provide a heated gas stream to said first chamber.

7. The process of claim 1 further comprising separating gas from said regenerated catalyst in said second chamber.

8. The process of claim 1 wherein the heated gas stream has temperature of at least 93° C. (200° F.).

9. The process of claim 1 further comprising measuring the oxygen concentration of the heated gas stream, comparing the measured oxygen concentration against a set point oxygen concentration and adjusting the flow rate of fuel to be contacted with air based on the comparison.

10. A process for regenerating coked catalyst comprising:
    contacting coked catalyst with oxygen in a first chamber of a regenerator to combust coke from said coked catalyst to provide regenerated catalyst and a flue gas stream;
    passing said regenerated catalyst and said flue gas stream from said first chamber to a second chamber of said regenerator; and
    distributing a heated gas stream to the second chamber separately from said flue gas stream having between about 0.001 and about 5 wt % oxygen and less than about 10 wppm sulfur oxides.

11. The process of claim 10 further comprising operating said first chamber with to insufficient oxygen in order to promote partial burn conditions.

12. The process of claim 10 further comprising distributing said heated gas stream to fluidize regenerated catalyst in said second chamber.

13. The process of claim 10 further comprising cooling said heated gas stream before it is distributed to said second chamber.

14. The process of claim 10 wherein said heated gas stream comprises no more than 2 wt % oxygen.

15. The process of claim 10 wherein the heated gas stream has temperature of at least 93° C. (200° F.).

* * * * *